P. E. HOLT.
SELF LAYING TRACK FOR TRACTION ENGINES AND OTHER VEHICLES.
APPLICATION FILED APR. 18, 1913.
1,186,785.
Patented June 13, 1916.
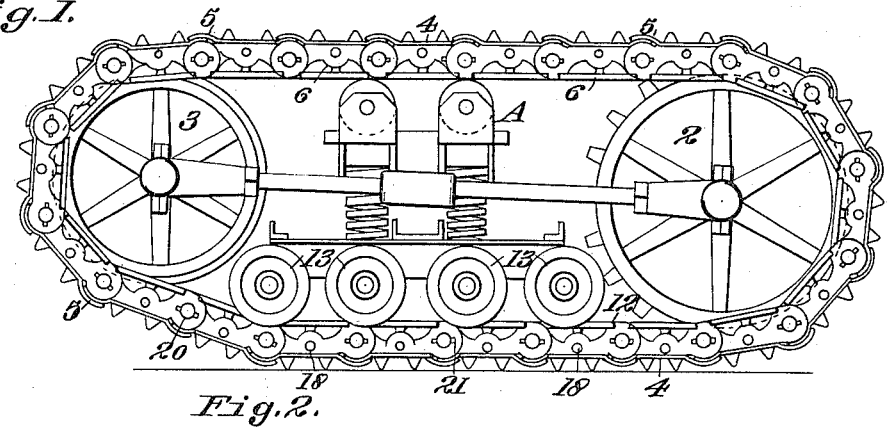
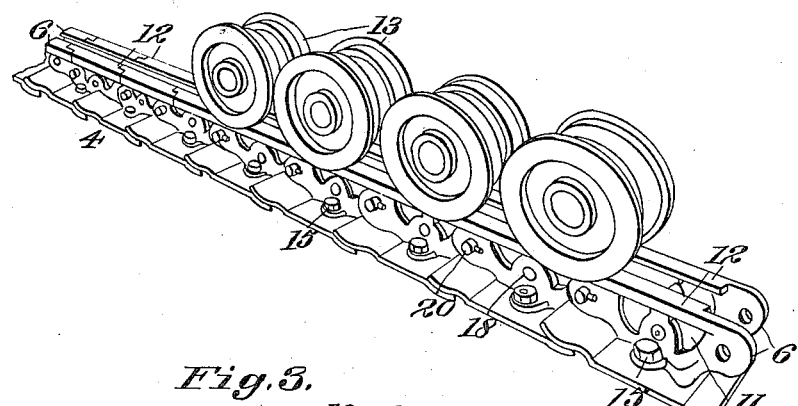
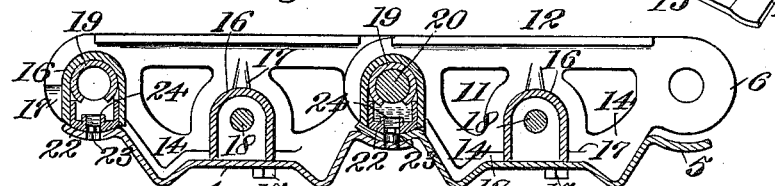
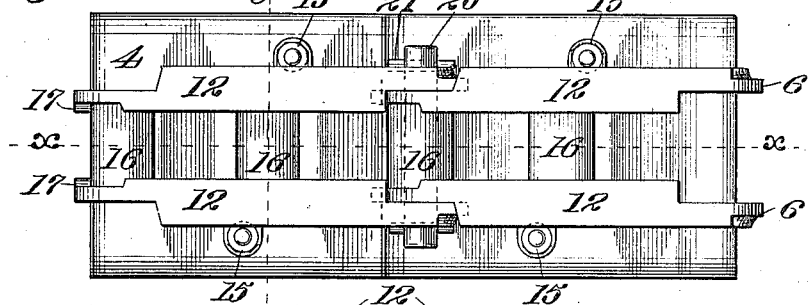
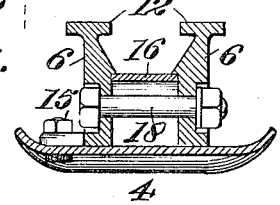
WITNESSES:
Charles Rokles
R. S. Berry
INVENTOR
Pliny E. Holt,
BY G. H. Strong
ATTORNEY

UNITED STATES PATENT OFFICE.

PLINY E. HOLT, OF PIEDMONT, CALIFORNIA.

SELF-LAYING TRACK FOR TRACTION-ENGINES AND OTHER VEHICLES.

1,186,785. Specification of Letters Patent. Patented June 13, 1916.

Application filed April 18, 1913. Serial No. 761,877.

*To all whom it may concern:*

Be it known that I, PLINY E. HOLT, a citizen of the United States, residing at Piedmont, in the county of Alameda and State of California, have invented new and useful Improvements in Self-Laying Tracks for Traction-Engines and other Vehicles, of which the following is a specification.

This invention relates to traction engines and other vehicles of the self-laying track or "caterpillar" type, and relates more particularly to the construction and arrangement of the track sections.

Among the objects of the present invention are the following:—to provide a simple, durable track construction on which track the vehicle truck may run; the truck being so elevated from the ground to avoid to a considerable extent the incursions of mud and grit; to form the link sections of the track with an open-work or grid construction so as to allow for the rejection of any mud which would otherwise tend to accumulate in and between the tracks to clog the links and sprockets and interfere with the operation of the machine; to provide track plates or track shoes having overlapping concavo-convex edges adapted to prevent the entry of mud and dirt between the track sections; to provide novel dust-proof means for lubricating the joints of the track; to provide track sections with profile lugs fitting corresponding sockets in the treads or pallets of the belt.

Another and very important object and feature of the present invention is to provide means on the links, independent of the articulations of the belt for engagement with the teeth of the driving sprocket so that the pull by the driving sprocket on the belt will not be confined practically to every other sprocket tooth as is the case now, but every tooth on the driving sprocket will have an inter-dental space on the belt with which to engage.

There are other objects and advantages which will be apparent hereinafter.

The invention consists of the parts and the combination and construction of parts as hereinafter more fully described and claimed, having reference to the accompanying drawings, in which—

Figure 1 is a side elevation, showing the application of the invention. Fig. 2 is a perspective showing the track belt opened out and indicating its principle as a continuous track for the truck to run on. Fig. 3 is a longitudinal section through a link on line X X of Fig. 4. Fig. 4 is a plan view of a pair of conjoined links. Fig. 5 is a cross section on line Y—Y of Fig. 4.

A represents a fragment of the frame of a traction engine to which the invention is particularly applied. On this frame is suitably mounted the rear driving sprocket 2 and the front idler 3. Passing around the front and rear sprockets 2—3 is my improved traction belt, or self-laying track, which is constructed as follows: 4 represents traction shoes made from heavy steel plates cut to rectangular form, which plates in practice vary from 8 inches to 30 inches in length; the length of the plate being figured cross-wise of the belt. Each plate is made concavo-convex along each transverse longitudinal edge, as shown at 5; the concaved edge of one plate being adapted to receive the convexed edge of a plate in advance, and conversely the rear convexed edge of one plate fitting the concavity of the succeeding plate. This concavo-convex bearing arrangement of one plate on another forms in effect a hinge joint between each plate, independent of the articulation of the links 6 to which the plates are fastened. The construction of these links 6 will be specified shortly. The purpose of the curved overlapping ends 5 of the shoe plates is to form web joints to prevent the incursion of mud and dirt between the track sections.

Each shoe plate 4 is secured to a track link 6, which track link is here shown as made in two sections placed side by side and bolted to the plate, as shown in Fig. 2. Each link or track shoe section comprises essentially a grid-like or open-work construction having side openings 11, and a rail-head portion 12, adapted to form with succeeding links a continuous track-way for the truck wheels 13 to run upon; said links having in addition to the openings 11 and rail-head 12 certain profile lugs 14, fitting the inner contour of the track shoe 4 to which it is fixed by the bolts or rivets 15. The links are made with successive wide and narrow ends, so that the narrow end of one link can fit in between the sides of the widened end of a succeeding link.

The rail-heads 12 are arranged as shown in pairs in parallel lines and spaced apart sufficiently to accommodate the teeth of the sprocket wheel 2. In order to suitably space the track sections apart, to give rigidity to them, to form reversible, interchangeable wearing shims and give a three-point sprocket tooth bearing for each link, I employ in the middle of the link and at the narrow end thereof, a substantially U-shaped hardened steel spacing sleeve 16 of a length to fit between the track sections and seat in suitable recesses formed by lugs 17 on the adjacent faces of the track sections; the middle sleeve 16 having a bolt 18 passing through it, which bolt also passes through the sides of the link sections and is adapted by means of a nut to draw the sections snug against the ends of the sleeve. The other sleeve 16 at the narrow end of the link fits over a removable segmental wearing shim 19, which latter has its ends fitting in corresponding perforations in the narrowed ends of the track sections; a bolt or pin 20 passing through the perforated ends of two interlocking links and through a wearing shim 19. The pivot pins 20 are held in place by cotter pins 21. The articulation of the links takes place at the joint formed by the pins 20 and their wearing shims 19; practically all the wear coming on the pins and shims. In order to relieve the pivot pins 20 of undue strain due to the pull by the sprocket teeth on the drive sprocket 2, it has been found highly desirable to provide the central bolt 18, with its reversible, interchangeable U-shaped sleeve 16 before mentioned, so that now each track link has practically three points of engagement with the teeth on the sprocket 2.

In order to accommodate the track links to the arcuate periphery of the drive sprocket 2, the central bolt 18 with its sleeve 16, are placed closer to the plane of the tread plate 4 than are the pivot pins 20 and their sleeve 16. The result of the foregoing construction, is that the pull of the sprocket wheel 2 is exerted at three fulcrum points on each link instead of two, as in the past, and a very considerable amount of the wear is taken off the end pivot pin bushings, which is a great advantage in heavy machines of this character. Another feature is, that these sleeves 16 are of standard form, so that they may be put in either at the center of the link or at the ends thereof, and when they become worn on one side they are easily taken out and reversed, without dismantling the belt links.

In order to provide lubrication for the pivot pins 20, an oil font or oil box 22 is housed in each U-shaped end sleeve 16, the bottom of the font resting on the tread plate 4, and the mouth of it coming up against the open side of the wearing shim 19. A hole 23 is made through the back of the wearing plate 4 to allow a screw plug 24 to be tapped into the back of the font 22 to enable the latter to be filled. The font is adapted to be filled with waste, or other absorbent packing, which is saturated with oil; the packing coming in direct contact with the pivot pin 20, so that the articulation is always well lubricated. At the same time, practically all dirt is excluded from the joint.

Particular stress is laid upon the value of the open grid-like construction of the link sides. The worst enemy of this type of traction belt is the accumulation of grit and mud within and about the link sections, especially if the mud is permitted to harden between the gudgeon blocks within the links. The open-sided links of the present invention, in conjunction with the plunger action of the sprocket teeth allows for the automatic discharge and lateral dislodgment of dirt, mud, gravel, or other foreign matter, tending to collect between the track rails.

Another important feature resides in the lugs 14 which fit the inner contour of the shoes and keep the shoes in place and prevent them from working loose from the links; much of the strain being taken off the plates by reason of these lugs and their indentations; the bolts and lugs and indentations coöperating to hold the tread plate or track shoe and link rigidly against relative movement.

The overlapping track shoes assist to exclude the entry of mud and dirt between the track sections from beneath. The continuous rail heads 12 with their break joint connections made integral with the links are highly advantageous in giving a smooth pathway for the trucks.

Having thus described my invention, what I claim and desire to secure by Letters Patent is—

1. A traction belt including a series of articulated links, each link having an inner and end sprocket teeth engaging means, said inner and end engaging means lying in a surface conforming substantially to the arc of the sprocket teeth to be engaged.

2. In a traction belt and in combination with a drive sprocket, a link comprising a pair of spaced parallel rail sections, pivot pins at the ends of the successive links, said pivot pins forming fulcra for the sprocket teeth and an intermediate fulcrum on the link independent of the pivots for the sprocket teeth, the end and intermediate fulcra lying in a surface conforming substantially to the arc of the sprocket teeth to be engaged.

3. In a traction belt and in combination with a drive sprocket, a link comprising a pair of spaced parallel rail sections, pivot pins at the ends of the successive links, said pivot pins forming fulcra for the sprocket teeth, an intermediate fulcrum on the link independent of the pivots for the sprocket teeth, and reversible interchangeable U-shaped sleeves removably fitting said fulcra and held in place by and between the rail sections.

4. In a traction belt and in combination with a drive sprocket, a link comprising a pair of spaced parallel rail sections and a three-point bearing for the sprocket teeth on the link, whereby the strain on the pivots of the link due to the pull of the sprocket teeth is practically relieved, the bearing points on the link lying in a surface conforming substantially to the arc of the sprocket teeth to be engaged.

5. A traction belt comprising a series of articulated links, each link comprising a pair of spaced parallel rail sections, pivot bolts forming the articulations, and wearing sleeves straddling the pivot bolts and which sleeves are insertible and removable from between the rail sections without interference with the pivot pins.

6. A traction belt comprising a series of articulated links, each link comprising a pair of spaced parallel rail sections, pivot bolts forming the articulations, and wearing sleeves straddling the pivot bolts and which sleeves are insertible and removable from between the rail sections without interference with the pivot pins, and a removable oil font housed in the sleeve and open to the pivot bolt.

7. A traction belt, comprising a series of articulated links, each link consisting of a pair of parallel rail sections, each pair joined to a succeeding pair by a pivot bolt, and a substantially U-shaped sleeve straddling each pivot bolt for engagement with the teeth of a sprocket wheel, said U-shaped sleeve abutting against and held in place by the opposite sides of the rail sections.

8. A traction belt, comprising a series of articulated links, each link consisting of a pair of parallel rail sections, each pair joined to a succeeding pair by a pivot bolt, and a substantially U-shaped sleeve straddling each pivot bolt for engagement with the teeth of a sprocket wheel, said U-shaped sleeve abutting against and held in place by the opposite sides of the rail sections, and an oil font housed by the sleeves and opening to the pivot bolt.

9. In a traction belt, a link consisting of a pair of parallel rail sections, perforated at their ends, a segmental wearing shim fitting said perforations, a pivot bolt passing through the shim and sections to form an articulation with a succeeding link, and a substantially U-shaped sleeve straddling the shim and abutting against the rail sections.

10. In a traction belt, a link consisting of a pair of parallel rail sections, perforated at their ends, a segmental wearing shim fitting said perforations, a pivot bolt passing through the shim and sections to form an articulation with a succeeding link, a substantially U-shaped sleeve straddling the shim and abutting against the rail sections, and an oil font housed by the sleeve and opening through the shim to the pivot bolt.

11. A link for a traction belt having a plurality of bearing points adapted to engage sprocket teeth, the bearing points lying in a surface conforming substantially to the arc of the sprocket teeth to be engaged.

12. A link for a traction belt having a three-point bearing adapted to engage sprocket teeth and lying in a surface conforming substantially to the arc of the sprocket teeth to be engaged.

13. A link for a traction belt having a spaced three-point bearing adapted to engage sprocket teeth and lying in a surface conforming substantially to the arc of the sprocket teeth to be engaged.

14. A link for a traction belt having central and end bearings adapted to engage sprocket teeth and lying in a surface conforming substantially to the arc of the sprocket teeth to be engaged.

15. A sprocket chain whereof each link has more than two points adapted to simultaneously engage its sprocket wheel, said points standing in the arc of a circle concentric with a periphery of such wheel.

In testimony whereof I have hereunto set my hand in the presence of two subscribing witnesses.

PLINY E. HOLT.

Witnesses:
  C. B. SESSIONS,
  F. L. SEIBEL.